(12) United States Patent
Tanaka

(10) Patent No.: US 9,080,493 B2
(45) Date of Patent: Jul. 14, 2015

(54) EXHAUST GAS CONTROL APPARATUS FOR INTERNAL COMBUSTION ENGINE

(75) Inventor: Hiroshi Tanaka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 915 days.

(21) Appl. No.: 12/568,290

(22) Filed: Sep. 28, 2009

(65) Prior Publication Data

US 2010/0077735 A1 Apr. 1, 2010

(30) Foreign Application Priority Data

Sep. 30, 2008 (JP) ................. 2008-252768

(51) Int. Cl.
*F01N 3/00* (2006.01)
*F01N 3/30* (2006.01)
*F01N 3/08* (2006.01)
*F01N 9/00* (2006.01)
*F01N 13/00* (2010.01)

(52) U.S. Cl.
CPC ............... *F01N 3/30* (2013.01); *F01N 3/0807* (2013.01); *F01N 3/0835* (2013.01); *F01N 9/00* (2013.01); *F01N 13/009* (2014.06); *Y02T 10/20* (2013.01); *Y02T 10/47* (2013.01)

(58) Field of Classification Search
CPC ....... F01N 3/0807; F01N 3/0835; F01N 3/30; F01N 9/00; Y02T 10/47
USPC .................... 60/304–306, 277–285, 287, 299
See application file for complete search history.

(56) References Cited

U.S. PATENT DOCUMENTS

| | | | | |
|---|---|---|---|---|
| 6,000,217 A | * | 12/1999 | Hochmuth | 60/274 |
| 6,122,908 A | * | 9/2000 | Wirmark | 60/274 |
| 6,253,547 B1 | * | 7/2001 | Watanabe et al. | 60/297 |
| 6,378,298 B2 | * | 4/2002 | Harima et al. | 60/288 |
| 6,446,431 B1 | * | 9/2002 | Bruck | 60/289 |
| 2007/0028596 A1 | * | 2/2007 | Takaku et al. | 60/277 |
| 2009/0120071 A1 | * | 5/2009 | Gandhi et al. | 60/287 |
| 2010/0024396 A1 | * | 2/2010 | Lupescu et al. | 60/284 |

FOREIGN PATENT DOCUMENTS

| | | |
|---|---|---|
| JP | 5-321646 | 12/1993 |
| JP | 5-321647 | 12/1993 |
| JP | 7-127437 | 5/1995 |
| JP | 10-169434 | 6/1998 |
| JP | 2002-188434 | 7/2002 |
| JP | 2004-124824 | 4/2004 |
| JP | 2008-25521 | 2/2008 |

* cited by examiner

*Primary Examiner* — Kenneth Bomberg
*Assistant Examiner* — Jason Sheppard
(74) *Attorney, Agent, or Firm* — Oblon, McClelland, Maier & Neustadt, L.L.P.

(57) ABSTRACT

An exhaust gas control apparatus for an internal combustion engine includes: a catalyst that is provided in an exhaust system of an internal combustion engine; a HC adsorption member that is provided in the exhaust system at a position downstream of the catalyst, and that has a function of adsorbing hydrocarbon in exhaust gas; a secondary air supply device that supplies secondary air to the exhaust system at a portion upstream of the catalyst; a supply prohibition unit that prohibits supply of the secondary air when the internal combustion engine is started; and a supply start time control unit that controls the time when supply of the secondary air is started after the internal combustion engine is started based on the amount of hydrocarbon discharged from the internal combustion engine or a value correlated with the amount of hydrocarbon discharged from the internal combustion engine.

16 Claims, 8 Drawing Sheets

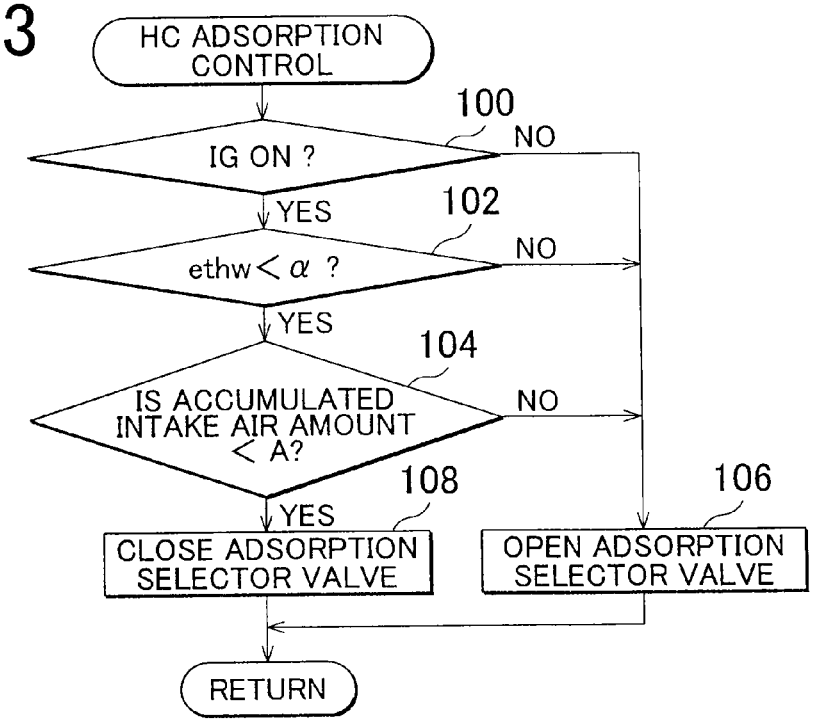
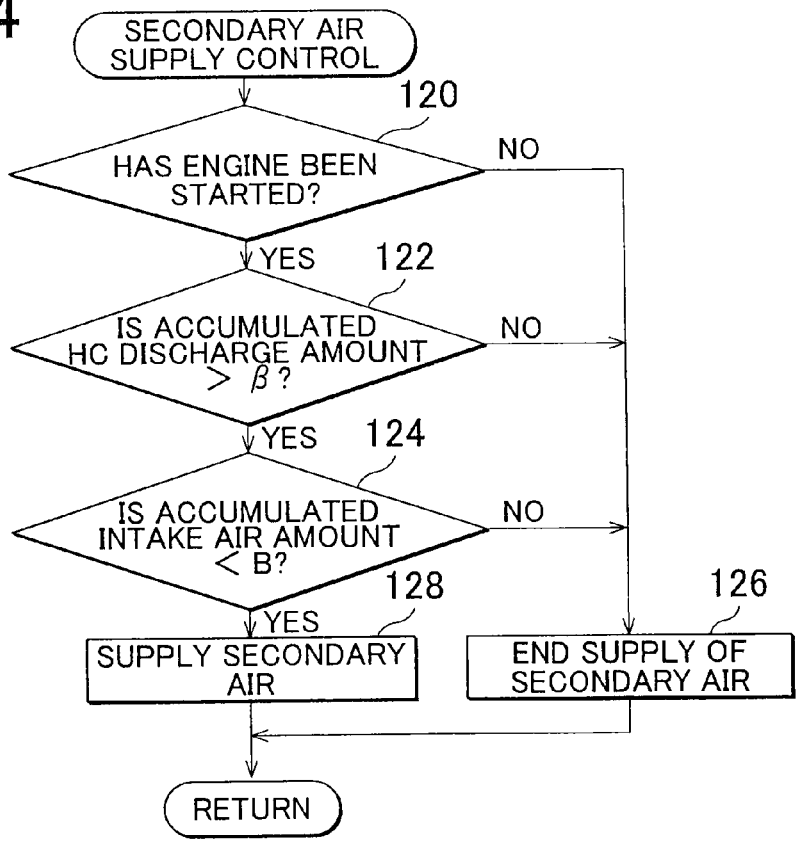

EXHAUST GAS CONTROL APPARATUS FOR INTERNAL COMBUSTION ENGINE

INCORPORATION BY REFERENCE

The disclosure of Japanese Patent Application No. 2008-252768 filed on Sep. 30, 2008 including the specification, drawings and abstract is incorporated herein by reference in its entirety.

BACKGROUND OF THE INVENTION

1. Field of the Invention

The invention relates to an exhaust gas control apparatus for an internal combustion engine.

2. Description of the Related Art

When an internal combustion engine is started, the engine temperature and the intake air temperature are low and the fuel is less likely to evaporate. Accordingly, a control for making the air-fuel ratio richer than the stoichiometric air-fuel ratio is executed. Therefore, an oxygen-deficient condition develops and a large amount of hydrocarbon (HC), which is an unburned fuel component, is discharged from the internal combustion engine. For a brief period after the internal combustion engine is started, an exhaust gas catalyst does not remove such a large amount of HC because the temperature of the exhaust gas catalyst is low. Therefore, technologies for addressing this problem have been developed. According to these technologies, an adsorption member that temporarily adsorbs HC is provided in an exhaust passage, and HC in the exhaust gas is trapped on the adsorption member until the temperature of the exhaust gas catalyst is increased to a sufficiently high temperature.

As the exhaust gas is introduced into the adsorption member, the temperature of the adsorption member gradually increases. Then, when the temperature of the adsorption member becomes equal to or higher than a predetermined desorption temperature, desorption of the HC, which has been adsorbed on the adsorption member, starts. Accordingly, in order to prevent the HC from being released into the atmosphere, the exhaust gas catalyst needs to be ready to remove the HC, that is, the temperature of the exhaust gas catalyst needs to be increased to the activation temperature, before the temperature of the adsorption member reaches the desorption temperature.

According to an existing technology, secondary air used to oxidize (burn) HC in the exhaust gas is supplied to an exhaust system in order to quickly increase the temperature of a catalyst after an internal combustion engine is started. If the secondary air is supplied to the exhaust system, the HC is burned in the exhaust system (afterburning of the HC occurs) and the exhaust gas temperature increases. As a result, the catalyst is warmed quickly.

Japanese Patent Application Publication No. 10-169434 (JP-A-10-169434) (refer to paragraph [0017]) describes an exhaust gas control apparatus which includes an adsorption member and a catalyst provided upstream of the adsorption member, and in which the secondary air is introduced to an exhaust system at a portion upstream of the catalyst during a period from when an internal combustion engine is started until when the catalyst is activated. However, the technology described in JP-A-10-169434 has the following problem. If the capacity of the adsorption member is fixed, as the flow rate of exhaust gas that passes through the adsorption member increases, the HC adsorption rate decreases. Therefore, if the flow rate of exhaust gas that passes through the adsorption member increases due to introduction of the secondary air into the exhaust system, the HC adsorption rate decreases. As described above, for a brief period after the internal combustion engine is started, a large amount of HC is discharged from the internal combustion engine. In this case, if the HC adsorption rate has been decreased due to supply of the secondary air, the amount of HC that is released into the atmosphere without being adsorbed on the adsorption member increases.

If supply of the secondary air is started when an engine is started, afterburning of HC is less likely to occur because the temperature of exhaust ports is still low. Japanese Patent Application Publication No. 2004-124824 (JP-A-2004-124824) describes a technology for addressing this problem. According to JP-A-2004-124824, during start-up of an engine, supply of the secondary air is prohibited until the temperature of exhaust ports becomes equal to or higher than a predetermined temperature so that the exhaust ports are prevented from being cooled by the secondary air.

JP-A-2004-124824 describes that if supply of the secondary air is started when the temperature of the exhaust ports becomes equal to or higher than the predetermined temperature, afterburning of HC reliably occurs and the exhaust ports are prevented from being cooled by the secondary air.

However, when the HC adsorption state is taken into account, if the time when supply of the secondary air is started is determined based on the temperature of the exhaust ports, the determined time is not always the optimum one. That is, if the amount of HC that is discharged from the engine reaches its peak after the temperature of the exhaust ports increases to the predetermined temperature and supply of the secondary air is started, a large amount of HC flows into the adsorption member in the state where the HC adsorption rate has been decreased due to an increase in the flow rate of the exhaust gas. Therefore, the HC is more likely to be released into the atmosphere without being adsorbed on the adsorption member.

According to the technology described in JP-A-2004-124824, if the increase in the temperature of the exhaust ports is delayed, the time when supply of the secondary air is started is delayed by an amount corresponding to a delay of the increase in the temperature. In this case, the time when promotion of catalyst warm-up due to supply of the secondary air becomes effective is delayed, and therefore the time when the catalyst is activated is also delayed. This makes it difficult to increase the temperature of the catalyst to a temperature equal to or higher than the activation temperature before the temperature of the adsorption member exceeds the desorption temperature. As a result, the amount of HC that is released into the atmosphere is likely to increase.

SUMMARY OF THE INVENTION

The invention provides an exhaust gas control apparatus for an internal combustion engine, which minimizes the amount of hydrocarbon that is released into the atmosphere when the internal combustion engine is started.

An aspect of the invention relates to an exhaust gas control apparatus for an internal combustion engine, which includes: a first catalyst that is provided in an exhaust system of an internal combustion engine; an adsorption member that is provided in the exhaust system at a position downstream of the first catalyst, and that has a function of adsorbing hydrocarbon in exhaust gas; a secondary air supply device that supplies secondary air to the exhaust system at a portion upstream of the first catalyst; a supply prohibition unit that prohibits supply of the secondary air when the internal combustion engine is started; and a supply start time control unit that controls the time when supply of the secondary air is started after the internal combustion engine is started based on the amount of hydrocarbon discharged from the internal combustion engine or a value correlated with the amount of hydrocarbon discharged from the internal combustion engine.

According to the aspect of the invention described above, supply of the secondary air is prohibited when the internal combustion engine is started. Thus, it is possible to prevent an increase in the flow rate of the exhaust gas that passes through the adsorption member, which may be caused by the secondary air, when the exhaust gas, which is discharged shortly after the internal combustion engine is started and in which the concentration of hydrocarbon is high, passes through the adsorption member. Therefore, the hydrocarbon is adsorbed on the adsorption member at a high adsorption rate when the exhaust gas in which the concentration of hydrocarbon is high passes through the adsorption member. Therefore, it is possible to reliably minimize the amount of hydrocarbon that is released into the atmosphere. According to the aspect of the invention described above, the time when supply of the secondary air is started after the internal combustion engine is started is controlled based on the amount of hydrocarbon discharged from the internal combustion engine or a value that is correlated with the amount of hydrocarbon discharged from the internal combustion engine. Thus, after the concentration of hydrocarbon in the exhaust gas that is introduced into the adsorption member becomes a relatively low value, supply of the secondary air is started without delay and warm-up of the first catalyst is promoted. Therefore, it is possible to reliably increase the temperature of the first catalyst to a value equal to or higher than the activation temperature during adsorption of the hydrocarbon. Accordingly, it is possible to reliably remove the hydrocarbon with the use of the first catalyst after adsorption of the hydrocarbon ends. As a result, it is possible to prevent release of the hydrocarbon into the atmosphere.

In the aspect of the invention described above, the supply start time control unit may start supply of the secondary air at the time when the exhaust gas, which is discharged from the internal combustion engine during a period from when the internal combustion engine is started until when the combustion air-fuel ratio exceeds a predetermined value near the stoichiometric air-fuel ratio, finishes passing through the adsorption member.

In the configuration described above, supply of the secondary air is started at the time when the exhaust gas, which is discharged from the internal combustion engine during the period from when the internal combustion engine is started until when the combustion air-fuel ratio exceeds the predetermined value near the stoichiometric air-fuel ratio, finishes passing through the adsorption member. The concentration of hydrocarbon in the exhaust gas that is discharged from the internal combustion engine during this period is high. Therefore, if supply of the secondary air is prohibited until the exhaust gas in which the concentration of hydrocarbon is high finishes passing through the adsorption member, it is possible to reliably adsorb the highly concentrated hydrocarbon on the adsorption member.

In the aspect of the invention described above, the hydrocarbon discharge characteristic during start-up of the internal combustion engine reaches its peak shortly after the internal combustion engine is started, and the supply start time control unit may start supply of the secondary air at the time when the exhaust gas, which is discharged from the internal combustion engine at or around the time when the hydrocarbon having the peak hydrocarbon discharge characteristic is discharged from the internal combustion engine, finishes passing through the adsorption member.

In the configuration described above, supply of the secondary air is started at the time when the exhaust gas, which is discharged from the internal combustion engine at or around the time when the hydrocarbon having the peak hydrocarbon discharge characteristic is discharged from the internal combustion engine, finishes passing through the adsorption member. Supply of the secondary air is prohibited until the exhaust gas in which the concentration of hydrocarbon is high finishes passing through the adsorption member. Therefore, it is possible to reliably adsorb the hydrocarbon, which is present in the exhaust gas in high concentration, on the adsorption member.

In the aspect of the invention described above, the value correlated with the amount of hydrocarbon discharged from the internal combustion engine may be the amount of fuel injected into the internal combustion engine.

In the configuration described above, the time when supply of the secondary air is started is controlled based on the amount of fuel injected into the internal combustion engine. Therefore, it is possible to accurately adjust the time when supply of the secondary air is started to the optimum time.

In the aspect of the invention described above, the value correlated with the amount of hydrocarbon discharged from the internal combustion engine may be the estimated air-fuel ratio that is estimated based on the amount of fuel injected into the internal combustion engine and the amount of air taken into the internal combustion engine.

In the configuration described above, the time when supply of the secondary air is started is controlled based on the estimated air-fuel ratio that is estimated based on the amount of fuel injected into the internal combustion engine and the amount of air taken into the internal combustion engine. Therefore, it is possible to accurately adjust the time when supply of the secondary air is started to the optimum time.

In the aspect of the invention described above, the amount of hydrocarbon may be the value obtained by accumulating the amount of hydrocarbon discharged from the internal combustion engine after the internal combustion engine is started.

In the configuration described above, the time when supply of the secondary air is started is controlled based on the value obtained by accumulating the amount of hydrocarbon discharged from the internal combustion engine after the internal combustion engine is started. Therefore, it is possible to accurately adjust the time when supply of the secondary air is started to the optimum time.

The exhaust gas control apparatus according to the aspect of the invention described above may include a hydrocarbon amount estimation unit that estimates the amount of hydrocarbon based on the representative temperature of the internal combustion engine.

In the configuration described above, the amount of hydrocarbon is estimated based on the representative temperature of the internal combustion engine. Therefore, it is possible to accurately control the time when supply of the secondary air is started with a simple structure.

The exhaust gas control apparatus according to the aspect of the invention described above may include: a selector valve that switches the exhaust gas introduction state between the state where the exhaust gas discharged from the internal combustion engine is introduced into the adsorption member and the state where the exhaust gas discharged from the internal combustion engine is not introduced into the adsorption member; a selector valve malfunction determination unit that determines whether the selector valve malfunctions; and a supply start unit that immediately starts supply of the secondary air if it is determined that the exhaust gas is not introduced into the adsorption member due to a malfunction of the selector valve.

In the configuration described above, if the hydrocarbon is not adsorbed on the adsorption member due to a malfunction of the selector valve when the internal combustion engine is started, supply of the secondary air is immediately started. Thus, it is possible to warm the first catalyst as quickly as possible. As a result, it is possible to minimize deterioration of emission that may occur if the hydrocarbon is not adsorbed on the adsorption member.

The exhaust gas control apparatus according to the aspect of the invention described above may include: a selector valve that switches the exhaust gas introduction state between the state where the exhaust gas discharged from the internal combustion engine is introduced into the adsorption member and the state where the exhaust gas discharged from the internal combustion engine is not introduced into the adsorption member; an adsorption end time control unit that ends adsorption of hydrocarbon by operating the selector valve to switch the exhaust gas introduction state to the state where the exhaust gas discharged from the internal combustion engine is not introduced into the adsorption member, when a predetermined hydrocarbon adsorption end condition is satisfied after the internal combustion engine is started; and a secondary air supply device malfunction determination unit that determines whether the secondary air supply device malfunctions. The adsorption end time control unit may include an adsorption end time delay unit that delays the hydrocarbon adsorption end time with respect to the regular hydrocarbon adsorption end time if it is determined that the secondary air supply device malfunctions.

In the configuration described above, if the secondary air supply device malfunctions when the internal combustion engine is started, the hydrocarbon adsorption period is extended. Therefore, it is possible to make the maximum use of the performance of the adsorption member to adsorb a larger amount of hydrocarbon on the adsorption member. Therefore, it is possible to minimize deterioration of emission due to a malfunction of the secondary air supply device.

The exhaust gas control apparatus according to the aspect of the invention described above may include a fuel property detection unit that detects the property of the fuel that is supplied to the internal combustion engine. The supply start time control unit may include a start time correction unit that corrects the time when supply of the secondary air is started based on the detection result obtained by the fuel property detection unit.

In the configuration described above, the property of the fuel that is supplied to the internal combustion engine is detected, and the time when supply of the secondary air is started is corrected based on the detection result. Therefore, even if the property of the fuel that is supplied to the internal combustion engine changes, it is possible to adjust the time when supply of the secondary air is started to the optimum time based on the property of the fuel.

The exhaust gas control apparatus according to the aspect of the invention may include a second catalyst that is provided downstream of the adsorption member or that is formed integrally with the adsorption member.

BRIEF DESCRIPTION OF THE DRAWINGS

The features, advantages, and technical and industrial significance of this invention will be described in the following detailed description of example embodiments of the invention with reference to the accompanying drawings, wherein the same or corresponding portions will be denoted by the same reference numerals and wherein:

FIG. 3 is a flowchart showing a routine that is executed in the first embodiment of the invention;

FIG. 4 is a flowchart showing a routine that is executed in the first embodiment of the invention;

DETAILED DESCRIPTION OF THE EMBODIMENTS

Figure 1:
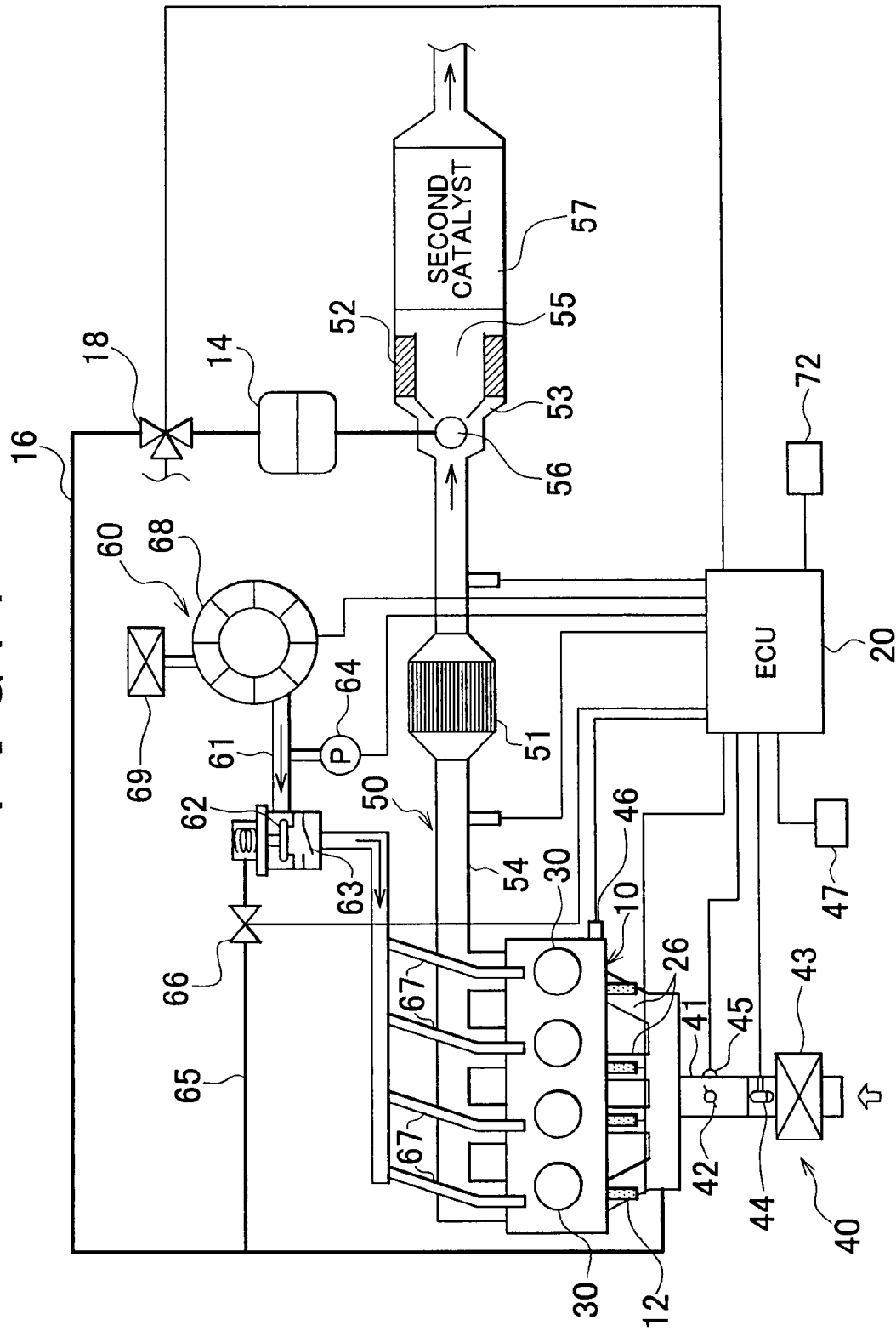
FIG. 1 is a view illustrating the configuration of a system according to a first embodiment of the invention.

Hereafter, embodiments of the invention will be described with reference to the accompanying drawings. Note that the same elements in the drawings are denoted by the same reference numerals, and description thereof will be provided only once.

FIG. 1 is a view illustrating the configuration of a system according to a first embodiment of the invention. As shown in FIG. 1, the system according to the first embodiment of the invention includes a four-cycle spark-ignition internal combustion engine 10. The internal combustion engine 10 is mounted in a vehicle (automobile). The internal combustion engine 10 according to the first embodiment of the invention is an inline four-cylinder internal combustion engine. However, the number of cylinders and the manner of arranging the cylinders are not limited to the ones in the first embodiment of the invention.

Each cylinder 30 of the internal combustion engine 10 is provided with a piston, a combustion chamber, an intake valve, an exhaust valve, a spark plug, etc. (all of which are not shown in FIG. 1) in addition to a fuel injector 12. An intake system 40, an exhaust system 50 and a secondary air supply device 60 are connected to the internal combustion engine 10.

The intake system 40 includes an intake passage 41, and intake branch pipes 26 through which the intake air is supplied from the intake passage 41 to the cylinders 30. A throttle valve 42 is provided in the intake passage 41. An air cleaner 43 is provided at the inlet of the intake passage 41. An airflow meter 44 that detects the intake air amount is provided between the air cleaner 43 and the throttle valve 42.

The exhaust system 50 includes an exhaust passage 54 through which the exhaust gas discharged from the cylinders 30 flows. A first catalyst 51 is provided at a middle portion of the exhaust passage 54. The first catalyst 51 functions as a three-way catalyst that removes HC (hydrocarbon), CO (carbon monoxide) and NOx (nitrogen oxide) from the exhaust gas at the same time.

In the exhaust system 50, a HC adsorption member 52 is provided downstream of the first catalyst 51. The HC adsorption member 52 contains, for example, zeolite, and has a function of temporarily adsorbing HC. The HC adsorption member 52 according to the first embodiment of the invention has a cylindrical shape. The exhaust gas from the exhaust passage 54 may flow into the HC adsorption member 52 through a passage 53.

A bypass passage 55 is formed on the inner side of the HC adsorption member 52. At the inlet of the bypass passage 55, an adsorption selector valve 56 that opens and closes the inlet is provided. The adsorption selector valve 56 is a valve that selects the passage, through which the exhaust gas flows, so that the exhaust gas flows into one of the HC adsorption member 52 and the bypass passage 55. That is, when the adsorption selector valve 56 closes the inlet of the bypass passage 55, the exhaust gas flows into the HC adsorption member 52 through the passage 53. On the other hand, if the adsorption selector valve 56 is opened, the exhaust gas flows into the bypass passage 55, in which the flow resistance is small, without flowing into the HC adsorption member 52.

The adsorption selector valve 56 is opened and closed by a diaphragm mechanism 14. The diaphragm mechanism 14 is driven by a negative pressure supplied from a negative pressure supply passage 16. The negative pressure supply passage 16 extends from a position downstream of the throttle valve 42 in the intake passage 41. A three-way solenoid valve 18 is provided at a middle portion of the negative pressure supply passage 16. The three-way solenoid valve 18 has an opening that opens into the atmosphere. The three-way solenoid valve 18 selects the pressure that is supplied to the diaphragm mechanism 14 from among the negative pressure and the atmospheric pressure, and supplies the selected pressure to the diaphragm mechanism 14. When supplied with the atmospheric pressure, the diaphragm mechanism 14 operates to open the adsorption selector valve 56. On the other hand, when supplied with the negative pressure, the diaphragm mechanism 14 operates to close the adsorption selector valve 56.

A second catalyst 57 is provided downstream of the HC adsorption member 52 and the bypass passage 55. The second catalyst 57 functions as a three-way catalyst that removes HC, CO and NOx in the exhaust gas at the same time.

The secondary air supply device 60 is structured so as to supply the air, taken in from the outside, to the exhaust ports of the cylinders 30 of the internal combustion engine 10, as the secondary air. In the secondary air supply passage 61, an air pump 68, an air switching valve 62, and a lead valve 63, which is a check valve, are provided from the upstream side in this order. A pressure sensor 64 is provided between the air pump 68 and the air-switching valve 62. A negative pressure supply passage 65, which extends from a position downstream of the throttle valve 42 in the intake passage 41, is connected to the air-switching valve 62. A solenoid valve 66 is provided in the negative pressure supply passage 65. The downstream-side portion of the secondary air supply passage 61 is connected to the exhaust ports of the cylinders 30 through a plurality of distribution pipes 67.

The air pump 68 is driven by an electric motor. The air pump 68 includes a motor that is rotated based on an instruction externally provided, and a pump that is rotated by the motor to pressurize the intake air. An air cleaner 69 is provided at the air inlet of the air pump 68. When the solenoid valve 66 is opened, the negative pressure in the intake passage 41 is introduced into the air-switching valve 62 and the air-switching valve 62 is opened. Then, the air, which is delivered from the air pump 68 under pressure, flows through the secondary air supply passage 61, and flows into the exhaust ports of the cylinders 30 through the distribution pipes 67.

The internal combustion engine 10 is provided with a crank position sensor 47 that includes a timing rotor fitted to an end portion of a crankshaft and an electromagnetic pick up, and a coolant temperature sensor 46 that detects the temperature of the coolant for the internal combustion engine 10.

The system according to the first embodiment of the invention further includes an electronic control unit (ECU) 20. The above described various sensors and actuators are electrically connected to the ECU 20.

Figure 2:
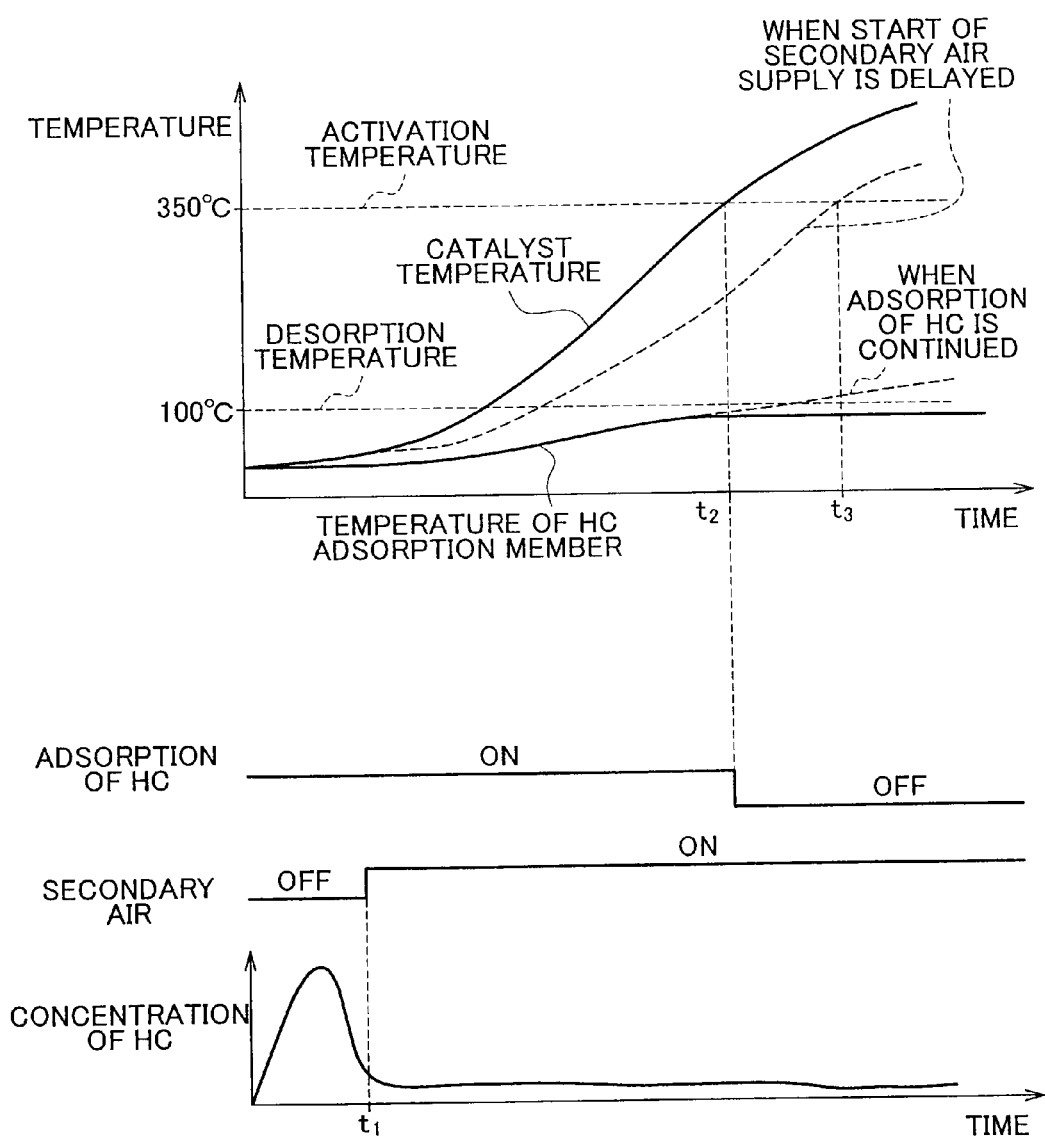
FIG. 2 is a timing chart for describing a HC adsorption control and a secondary air supply control according to the first embodiment of the invention.

FIG. 2 is a timing chart for describing a HC adsorption control and a secondary air supply control according to the first embodiment of the invention. In FIG. 2, the origin point of the time axis (abscissa axis) represents the time point at which the internal combustion engine 10 is started. The state in which HC adsorption is ON in FIG. 2 signifies the state in which the adsorption selector valve 56 is closed, that is, the exhaust gas is introduced into the HC adsorption member 52. The state in which HC adsorption is OFF in FIG. 2 signifies the state in which the adsorption selector valve 56 is open, that is, the exhaust gas is introduced into the bypass passage 55. The state in which the secondary air is ON in FIG. 2 signifies the state in which the secondary air is supplied by the secondary air supply device 60. The state in which the secondary air is OFF in FIG. 2 signifies the state in which the secondary air supply device 60 does not supply the secondary air.

When the internal combustion engine 10 is started and for a brief period after the internal combustion engine 10 is started, the fuel is less likely to evaporate because the temperature of the internal combustion engine 10 and the temperature of the intake air are low. Therefore, a control for increasing the amount of fuel that is injected from the fuel injectors 12 to make the air-fuel ratio richer than the stoichiometric air-fuel ratio is executed. As the air-fuel ratio becomes richer, the concentration of HC in the exhaust gas discharged from the internal combustion engine 10 increases. For a brief period after the internal combustion engine 10 is started, the temperature of the first catalyst 51 is low and does not reach the activation temperature. Therefore, it is not possible to sufficiently purify the exhaust gas, in which the concentration of hydrocarbon is high and which is discharged from the internal combustion engine 10, with the use of the first catalyst 51.

Therefore, according to the first embodiment of the invention, when the internal combustion engine 10 is started and for a brief period after the internal combustion engine 10 is started, the exhaust gas is introduced into the HC adsorption member 52 and the HC is adsorbed on the HC adsorption member 52, as shown in FIG. 2. Thus, it is possible to minimize the amount of HC that is released into the atmosphere.

If the exhaust gas is continuously introduced into the HC adsorption member 52, the temperature of the HC adsorption member 52 is increased by the heat of the exhaust gas. The HC adsorption member 52 has the property of desorbing the HC, which has been adsorbed on the HC adsorption member 52, if the temperature of the HC adsorption member 52 becomes high. Therefore, in order to prevent the HC, which has been adsorbed on the HC adsorption member 52, from being desorbed and released into the atmosphere, the adsorption selector valve 56 needs to be opened to end adsorption of the HC before the temperature of the HC adsorption member 52 exceeds the temperature at which desorption of the HC starts (hereinafter, referred to as "desorption temperature").

In the example shown in FIG. 2, the adsorption selector valve 56 is opened at time $t_2$ to end adsorption of the HC. At this time, the temperature of the HC adsorption member 52 is lower than the desorption temperature (100° C., in the first embodiment of the invention). If the adsorption selector valve 56 is opened, the temperature of the HC adsorption member 52 stops increasing because the exhaust gas flows into the bypass passage 55. Therefore, the temperature of the HC adsorption member 52 is maintained below the desorption temperature so that desorption of the HC is prevented.

While the exhaust gas is introduced into the HC adsorption member 52, the temperature of the first catalyst 51 is also increased by, for example, the heat of the exhaust gas. Because the first catalyst 51 is provided at a position close to the internal combustion engine 10 (upstream of the exhaust system 50), the rate of increase in the temperature of the first catalyst 51 is higher than the rate of increase in the temperature of the HC adsorption member 52. In order to prevent the HC from being released into the atmosphere, the first catalyst 51 needs to be ready to remove the HC, that is, the temperature of the first catalyst 51 needs to be increased to a value equal to or higher than the activation temperature (350° C.) before adsorption of the HC on the HC adsorption member 52 ends. That is, in order to prevent the HC from being released into the atmosphere, the temperature of the first catalyst 51 needs to be reliably increased to a value equal to or higher than the activation temperature before the temperature of the HC adsorption member 52 reaches the desorption temperature.

For a brief period after the internal combustion engine 10 is started, the fuel injection amount is increased and the air-fuel ratio of the air-fuel mixture burned in the combustion chambers (hereinafter, referred to as "combustion air-fuel ratio") is richer than the stoichiometric air-fuel ratio. Therefore, a large amount of HC is contained in the exhaust gas discharged from the internal combustion engine 10, whereas the amount of oxygen in the exhaust gas is insufficient. According to the first embodiment of the invention, the secondary air supply device 60 supplies the secondary air into the exhaust ports after the internal combustion engine 10 is started. In this way, afterburning of the HC in the exhaust gas discharged from the internal combustion engine occurs in the exhaust ports. Because the temperature of the exhaust gas that flows into the first catalyst 51 is increased by the afterburning of the HC, the increase in the temperature of the first catalyst 51 is promoted.

If the temperature of the exhaust ports is excessively low, even if the secondary air is supplied, afterburning of the HC is less likely to occur. Therefore, supply of the secondary air is less likely to contribute to the increase in the temperature of the exhaust gas. Except for such a case, basically, supply of the secondary air should be started as soon as possible after the internal combustion engine 10 is started, because the temperature of the first catalyst 51 is increased more quickly.

However, if supply of the secondary air is started at the same time that the internal combustion engine 10 is started, the following inconvenience may occur. As the capacity of the HC adsorption member 52 increases, the HC adsorption rate increases. However, the capacity of the HC adsorption member 52 is limited because the space for the HC adsorption member 52 in the vehicle is limited. If the capacity of the HC adsorption member 52 is fixed, as the flow rate of the exhaust gas that passes through the HC adsorption member 52 increases, the HC adsorption rate decreases. Therefore, if the flow rate of the exhaust gas that passes through the HC adsorption member 52 increases due to supply of the secondary air, the HC adsorption rate decreases and the ratio of the amount of HC that passes through the HC adsorption member 52 to the entire amount of HC increases.

The lowest graph in FIG. 2 shows a temporal change in the concentration of HC in the exhaust gas discharged from the internal combustion engine 10. As shown in this graph, the concentration of HC in the exhaust gas discharged from the internal combustion engine 10 (i.e., the amount of HC that is discharged from the internal combustion engine 10) significantly increases and reaches its peak shortly after the internal combustion engine 10 is started. This occurs for the following reasons. When the time that has elapsed after the internal combustion engine 10 is started is shorter, the fuel injected from the fuel injectors 12 is less likely to evaporate because the temperatures of the intake ports and the combustion chambers of the internal combustion engine 1 are lower. Therefore, when the time that has elapsed after the internal combustion engine 10 is started is shorter, the fuel injection amount is increased by a larger amount. The fuel that has failed to evaporate adheres to wall faces of the intake ports and the combustion chambers in the form of liquid. The fuel that has adhered to the wall faces evaporates slightly late. Shortly after the internal combustion engine 10 is started, the combustion air-fuel ratio becomes significantly richer than the stoichiometric air-fuel ratio because the amount of fuel injected from the fuel injectors 12 is increased and the fuel that has adhered to the wall faces evaporates in large amounts and flows into the cylinders. Therefore, the amount of HC that is discharged from the internal combustion engine 10 significantly increases and reaches its peak shortly after the internal combustion engine 10 is started. Then, when the fuel injection amount, which has been increased and is used when the internal combustion engine 10 is started, is decreased, the combustion air-fuel ratio comes close to the stoichiometric air-fuel ratio, and the amount of fuel that adheres to the wall faces decreases, the amount of HC that is discharged from the internal combustion engine 10 is decreased to and maintained at a relatively small amount.

As described above, the amount of HC that is discharged from the internal combustion engine 10 significantly increases and reaches its peak shortly after the internal combustion engine 10 is started. In order to minimize the amount of HC that is released into the atmosphere, the HC in the exhaust gas, which is discharged from the internal combustion engine 10 at or around the time when the peak amount of HC is discharged from the internal combustion engine 10, needs to be reliably adsorbed on the HC adsorption member 52. However, if the amount of exhaust gas that passes through the HC adsorption member 52 is increased due to supply of the secondary air, the adsorption rate decreases and the amount of HC that passes through the HC adsorption member 52 without being adsorbed on the HC adsorption member 52 increases, as described above. Therefore, in order to adsorb the large amount of HC in the exhaust gas, which is discharged from the internal combustion engine 10 at or around the time when the peak amount of HC is discharged from the internal combustion engine 10, on the HC adsorption member 52 at a high adsorption rate, supply of the secondary air should not be started and the amount of exhaust gas that passes through the HC adsorption member 52 should not be increased until the exhaust gas, which is discharged from the internal combustion engine 10 at or around the time when the peak amount of HC is discharged from the internal combustion engine 10, finishes passing through the HC adsorption member 52.

Therefore, according to the first embodiment of the invention, the time when supply of the secondary air is started is controlled based on the amount of HC that is discharged from the internal combustion engine 10. That is, according to the first embodiment of the invention, supply of the secondary air is started at the time (time $t_1$ in FIG. 2) when the exhaust gas, which is discharged from the internal combustion engine 10 at or around the time when the peak amount of HC is discharged from the internal combustion engine 10, finishes passing through the HC adsorption member 52, as shown in FIG. 2. Thus, when the exhaust gas, which is discharged from the internal combustion engine 10 shortly after the internal combustion engine 10 is started and which contains a large amount of HC, flows into the HC adsorption member 52, the flow rate of the exhaust gas that passes through the HC adsorption member 52 is kept low so that the HC adsorption rate is kept high. Accordingly, a large amount of HC, which is discharged from the internal combustion engine 10 shortly after the internal combustion engine 10 is started, is reliably adsorbed on the HC adsorption member 52. As a result, it is possible to minimize the amount of HC that is released into the atmosphere.

According to the first embodiment of the invention, after the exhaust gas, which is discharged from the internal combustion engine 10 at or around the time when the peak amount of HC is discharged from the internal combustion engine 10, finishes passing through the HC adsorption member 52, supply of the secondary air is started without delay. Thus, it is possible to promote an increase in the temperature of the first catalyst 51. Accordingly, the temperature of the first catalyst 51 is increased to a temperature equal to or higher than the activation temperature before the temperature of the HC adsorption member 52 reaches the desorption temperature (time $t_2$ in FIG. 2). Accordingly, after adsorption of the HC on the HC adsorption member 52 ends at time $t_2$, the HC is sufficiently removed by the first catalyst 51. Therefore, even after adsorption of the HC on the HC adsorption member 52 ends, it is possible to reliably prevent the HC from being released into the atmosphere.

As described above, after passing its peak that is reached shortly after the internal combustion engine 10 is started, the amount of HC that is discharged from the internal combustion engine 10 is decreased to and maintained at a relatively small amount (see the lowest graph in FIG. 2). Therefore, after the amount of HC that is discharged from the internal combustion engine 10 passes its peak, even if the HC adsorption rate is decreased due to supply of the secondary air, the absolute amount of HC that passes through the HC adsorption member 52 without being adsorbed on the HC adsorption member 52 is small. Therefore, during the period from time $t_1$ to time $t_2$ in FIG. 2, it is possible to minimize the amount of HC that is released into the atmosphere.

Unlike the first embodiment of the invention, if the time when supply of the secondary air is started is not controlled based on the amount of HC that is discharged from the internal combustion engine 10, the time when supply of the secondary air is started may be later than the optimum time. In this case, the following inconvenience may occur. When start of supply of the secondary air is delayed, the increase in the temperature of the first catalyst 51 is delayed, as indicated by the dashed line in FIG. 2. Therefore, the temperature of the first catalyst 51 has not reached the activation temperature when adsorption of the HC ends at time $t_2$. Accordingly, the HC is released into the atmosphere. If the HC is continuously adsorbed on the HC adsorption member 52 until time $t_3$ when the temperature of the first catalyst 51 reaches the activation temperature, the temperature of the HC adsorption member 52 exceeds the desorption temperature, and desorption of the HC is started. Therefore, in this case as well, the HC is released into the atmosphere.

FIGS. 3 and 4 show flowcharts of routines that are executed by the ECU 20 in the first embodiment of the invention in order to execute the above-described controls. These routines are periodically executed at predetermined time intervals.

FIG. 3 shows a routine of a HC adsorption control. In the routine, first, it is determined whether an ignition switch of a vehicle is on (step (hereinafter, referred to as "S") 100). If it is determined that the ignition switch is not on, that is, the internal combustion engine 10 has not been started, the adsorption selector valve 56 is opened (S106). That is, the exhaust gas does not flow into the HC adsorption member 52.

On the other hand, if it is determined in S100 that the ignition switch is on, it is determined whether the temperature ethw of the coolant for the internal combustion engine 10, which is detected by the coolant temperature sensor 46 (hereinafter, referred to as "coolant temperature ethw"), is lower than the reference value $\alpha$ (S102). If the coolant temperature ethw is equal to or higher than the reference value $\alpha$, it is determined that the internal combustion engine 10 is warmed. In this case, it is determined that the temperature of the first catalyst 51 or the second catalyst 57 is equal to or higher than the activation temperature. Accordingly, the exhaust gas need not be introduced into the HC adsorption member 52 because the HC is removed by the first catalyst 51 or the second catalyst 57. Therefore, in this case, the adsorption selector valve 56 is opened so that the exhaust gas is not introduced into the HC adsorption member 52 (S106).

On the other hand, if it is determined in S102 that the coolant temperature ethw is lower than the reference value $\alpha$, it is determined that the HC needs to be adsorbed on the HC adsorption member 52 because the temperature of the first catalyst 51 and the temperature of the second catalyst 52 are low. In this case, it is determined whether the accumulated intake air amount is smaller than the reference value A (S104). The accumulated intake air amount is a value obtained by accumulating the intake air amount detected by the airflow meter 44 after the internal combustion engine 10 is started. The reference value A is set in advance, and used to determine the time when adsorption of the HC should end. If it is determined in S104 that the accumulated intake air amount has not reached the reference value A, the adsorption selector valve 56 is closed (S108). That is, the exhaust gas is introduced into the HC adsorption member 52 so that the HC is reliably adsorbed on the HC adsorption member 52.

As described above, if the exhaust gas is continuously introduced into the HC adsorption member 52, the temperature of the HC adsorption member 52 increases. Then, if the temperature of the HC adsorption member 52 exceeds the desorption temperature, desorption of the HC from the HC adsorption member 52 starts. Therefore, adsorption of the HC should end before the temperature of the HC adsorption member 52 reaches the desorption temperature. The temperature of the HC adsorption member 52 is correlated with the accumulated amount of exhaust gas that is introduced into the HC adsorption member 52. The accumulated exhaust gas amount is correlated with the accumulated intake air amount. The reference value A is set in advance as a value used to determine whether the temperature of the HC adsorption member 52 increases to a value close to the desorption temperature. Therefore, if it is determined in S104 that the accumulated intake air amount has reached the reference value A, it is determined that the temperature of the HC adsorption member 52 is increased to a value close to the desorption temperature. Therefore, the adsorption selector valve 56 is opened to end adsorption of the HC.

FIG. 4 shows a routine of a secondary air supply control. In the routine, first, it is determined whether the internal combustion engine 10 has been started (S120). More specifically, if the engine speed calculated based on a signal from the crank position sensor 47 exceeds 400 rpm, it is determined that start-up of the internal combustion engine 20 has been completed, that is, the internal combustion engine 10 has been started. If it is determined in S120 that the internal combustion engine 10 has not been started, the secondary air is not supplied (S126).

Figure 5:
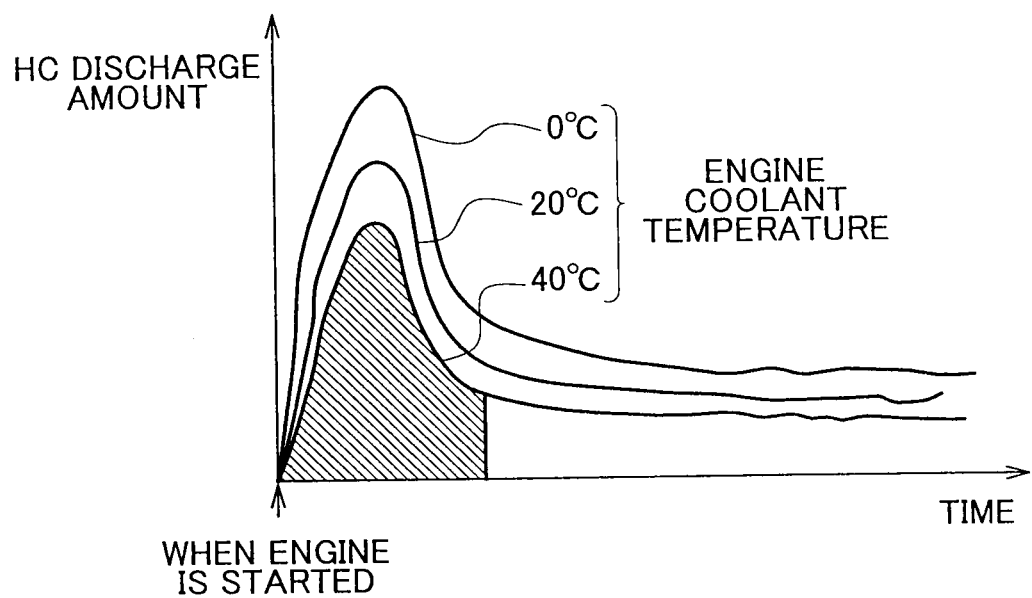
FIG. 5 is a map showing a temporal change in the HC discharge amount per unit time from when the internal combustion engine is started.

On the other hand, if it is determined in S120 that the internal combustion engine 10 has been started, it is determined whether the accumulated HC discharge amount, which is obtained by accumulating the amount of HC that is discharged from the internal combustion engine 10, has exceeded the reference value β (S122). The accumulated HC discharge amount is a value obtained by accumulating the amount of HC that is discharged from the internal combustion engine 10 per unit time after the internal combustion engine 10 is started. According to the first embodiment of the invention, the accumulated HC discharge amount is calculated as follows. FIG. 5 is a map that shows a temporal change in the HC discharge amount per unit time after the internal combustion engine 10 is started. As described above, the HC discharge amount reaches its peak shortly after the internal combustion engine 10 is started. As shown in FIG. 5, the HC discharge amount increases as the temperature of the internal combustion engine 10 (coolant temperature is used as the representative temperature of the internal combustion engine 10 in the first embodiment of the invention) decreases. This is because as the temperature of the internal combustion engine 10 decreases, the fuel is less likely to evaporate. Therefore, the fuel injection amount is increased by an amount corresponding to the amount of fuel that fails to evaporate. For a brief period after the internal combustion engine 10 is started, the internal combustion engine 10 usually idles at a predetermined engine speed and a predetermined load factor (intake air amount). Therefore, the HC discharge amount is expressed in a map that indicates the relationship with the time that has elapsed after the internal combustion engine 10 is started, which is obtained at each of several coolant temperatures. That is, according to the first embodiment of the invention, the HC discharge amount per unit time is calculated based on the coolant temperature and the time that has elapsed after the internal combustion engine 10 is started according to the map shown in FIG. 5. The ECU 20 successively calculates the accumulated HC discharge amount by accumulating the HC discharge amount per unit time, which is calculated according to the map shown in FIG. 5.

Figure 6:
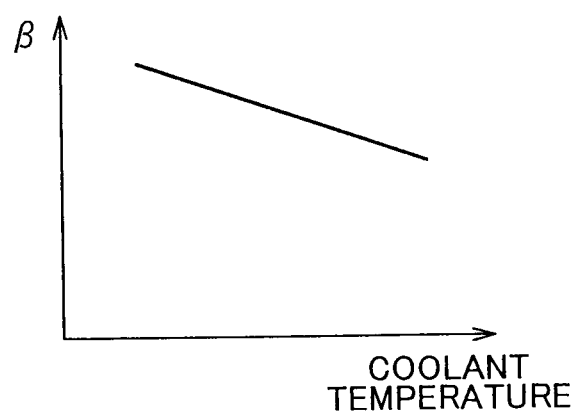
FIG. 6 is a map used to calculate a reference value $\beta$.

FIG. 6 is a map used to calculate the reference value β. As shown in FIG. 6, the reference value β increases as the coolant temperature decreases. For example, when the coolant temperature is 40° C., the reference value β is calculated as a value that corresponds to the area of the hatched portion in FIG. 5. The reference value β contains the value that corresponds to the delay period that is required for the exhaust gas to finish passing through the HC adsorption member 52. If the thus calculated reference value β is used, it is possible to accurately determine whether the exhaust gas, which is discharged from the internal combustion engine 10 at or around the time when the peak amount of HC is discharged from the internal combustion engine 10, has finished passing through the HC adsorption member 52.

Accordingly, if it is determined in S122 that the accumulated HC discharge amount has not exceeded the reference value β, it is determined that the exhaust gas, which is discharged from the internal combustion engine 10 at or around the time when the peak amount of HC is discharged from the internal combustion engine 10, has not finished passing through the HC adsorption member 52. In this case, because the exhaust gas that contains the peak amount of HC is introduced into the HC adsorption member 52, a high HC adsorption rate should be achieved. Therefore, it is determined that supply of the secondary air should not be started. In this case, the secondary air is not supplied (S126).

On the other hand, if it is determined in S122 that the accumulated HC discharge amount has exceeded the reference value β, it is determined that the exhaust gas, which is discharged from the internal combustion engine 10 at or around the time when the peak amount of HC is discharged from the internal combustion engine 10, has finished passing through the HC adsorption member 52. That is, it is determined that the concentration of HC in the exhaust gas that flows into the HC adsorption member 52 is decreased to a relatively low value. Therefore, it is determined that the secondary air may be supplied. In this case, it is determined whether the accumulated intake air amount is smaller than the reference value B (S124). The reference value B is a value that is set in advance and used to determine the time when supply of the secondary air should end. If it is determined in S124 that the accumulated intake air amount has not reached the reference value B, the secondary air is supplied to the exhaust ports of the cylinders 30 of the internal combustion engine 10 by the secondary air supply device 60 (S128). Because the HC in the exhaust gas is burned by the oxygen in the secondary air, the temperature of the exhaust gas increases and the first catalyst 51 is quickly warmed.

The reference value B is a value that is set in advance and used to determine whether the first catalyst 51 is sufficiently warmed. Therefore, if it is determined in S124 that the accumulated intake air amount has reached the reference value B, it is determined that the first catalyst 51 is sufficiently warmed. Therefore, in this case, supply of the secondary air ends (S126).

With the controls according to the first embodiment of the invention, supply of the secondary air is prohibited until the exhaust gas which is discharged from the internal combustion engine 10 at or around the time when the peak amount of HC is discharged from the internal combustion engine 10, that is, the exhaust gas in which the concentration of HC is high finishes passing through the HC adsorption member 52. Therefore, until the exhaust gas, which is discharged from the internal combustion engine 10 at or around the time when the peak amount of HC is discharged from the internal combustion engine 10, finishes passing through the HC adsorption member 52, the flow rate of the exhaust gas that passes trough the HC adsorption member 52 is kept low, and a high HC adsorption rate is achieved. Therefore, it is possible to sufficiently purify the exhaust gas in which the concentration of HC is high with the use of the HC adsorption member 52. As a result, it is possible to reliably minimize the amount of HC that is released into the atmosphere.

With the controls according to the first embodiment of the invention, after the exhaust gas, which is discharged from the internal combustion engine 10 at or around the time when the peak amount of HC is discharged from the internal combustion engine 10, finishes passing through the HC adsorption member 52, supply of the secondary air is started without delay to promote warm-up of the first catalyst 51. Therefore, the temperature of the first catalyst 51 is reliably increased to a value equal to or higher than the activation temperature before adsorption of the HC ends (before the temperature of the HC adsorption member 52 exceeds the desorption temperature). Therefore, when the member that is used to remove the HC is changed from the HC adsorption member 52 to the first catalyst 51, release of the HC into the atmosphere is reliably suppressed.

In the first embodiment of the invention, the time when supply of the secondary air is started is controlled based on the accumulated HC discharge amount in S122. However, the time when supply of the secondary air is started may be controlled based on the HC discharge amount per unit time. That is, supply of the secondary air may be started after it is determined that the HC discharge amount per unit time, which is calculated according to the map shown in FIG. 5, passes its peak and is decreased to a predetermined value.

According to the first embodiment of the invention, the HC discharge amount is calculated according to the map shown in FIG. 5. However, the method of calculating the HC discharge amount is not limited to this. For example, a map for determining the HC discharge amount (HC concentration) based on the engine speed, the load factor (intake air amount) and the coolant temperature may be prepared in advance, and the HC discharge amount may be calculated according to the map.

In the first embodiment of the invention, the method of desorbing the HC from the HC adsorption member 52 and removing the HC from the exhaust gas is not particularly limited. An example of the method will be described below. After the adsorption selector valve 56 is opened to end adsorption of the HC, the increase in the temperature of the HC adsorption member 52 virtually stops. However, the temperature of the HC adsorption member 52 increases albeit only slightly by the heat of the exhaust gas that flows through the bypass passage 55. When the temperature of the HC adsorption member 52 exceeds the desorption temperature, the HC is gradually desorbed from the HC adsorption member 52. While the HC is desorbed from the HC adsorption member 52, the temperature of the second catalyst 57 is gradually increased to a temperature equal to or higher than the activation temperature. Therefore, the HC desorbed from the HC adsorption member 52 is removed by the second catalyst 57, and is prevented from being released into the atmosphere. The HC that has been adsorbed on the HC adsorption member 52 is purged in this way. That is, the HC is adsorbed on the HC adsorption member 52 again when the internal combustion engine 10 is started next time.

As described above, when the internal combustion engine 10 is started, the fuel injection amount is increased by an amount that corresponds to the amount of fuel that fails to evaporate so that the fuel is reliably burned in the combustion chambers. In the first embodiment of the invention, separately from such an increase in the fuel injection amount, another increase in amount of fuel may be achieved. This increase in amount of fuel is achieved in order to supply the HC that is burned by the secondary air when the secondary air is supplied. In this way, a larger amount of HC is burned by the secondary air through afterburning. Accordingly, it is possible to further increase the temperature of the exhaust gas that flows into the first catalyst 51 to further promote warm-up of the first catalyst 51. Hereafter, a control for increasing the amount of fuel to supply the HC that is burned by the secondary air will be referred to as "catalyst warming fuel amount increase control".

The amount of secondary air that is introduced into the exhaust ports is determined based on the backpressure applied to the exhaust gas discharged from the internal combustion engine 10 and the performance of the air pump 68. Therefore, when the adsorption selector valve 56 is opened to end adsorption of the HC on the HC adsorption member 52, the amount of secondary air that is introduced into the exhaust ports increases. This is because the flow resistance when the exhaust gas flows through the bypass passage 55 is lower than the flow resistance when the exhaust gas flows through the HC adsorption member 52, and therefore, the backpressure applied to the exhaust gas discharged from the internal combustion engine 10 decreases after adsorption of the HC ends.

If the amount of secondary air that is introduced into the exhaust ports increases, the amount of HC that is burned through afterburning is increased by an amount corresponding to the increase in the amount of secondary air. Therefore, in the first embodiment of the invention, the amount of increase in the fuel, which is achieved through the catalyst warming fuel amount increase control, is larger after adsorption of the HC ends than when adsorption of the HC is taking place.

Figure 7:
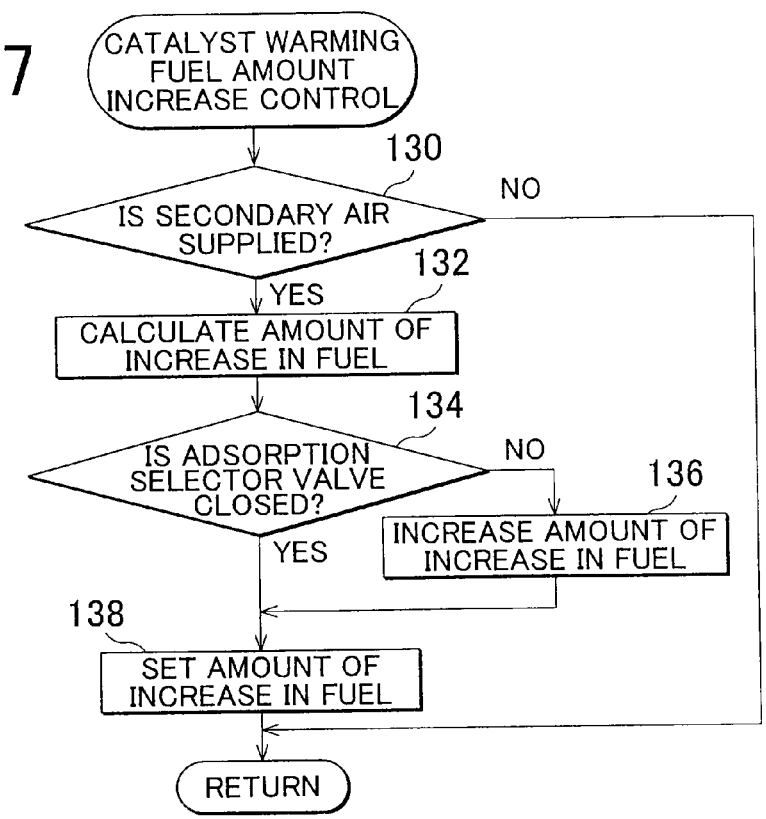
FIG. 7 is a flowchart showing a routine that is executed in the first embodiment of the invention.

FIG. 7 shows a flowchart of a routine that is executed by the ECU 20 in the first embodiment of the invention in order to execute the above-described catalyst warming fuel amount increase control. In the routine shown in FIG. 7, it is determined whether secondary air is supplied (S130). If it is determined that the secondary air is not supplied, the routine ends because the catalyst warming fuel amount increase control is not executed. On the other hand, if it is determined that the secondary air is supplied, an amount of increase in the fuel, which should be achieved through the catalyst warming fuel amount increase control, is calculated based on the coolant temperature, etc. (S132).

After S132 is completed; it is determined whether the adsorption selector valve 56 is closed, that is, whether adsorption of the HC is taking place (S134). If it is determined in S132 that the adsorption selector valve 56 is closed, that is, adsorption of the HC is taking place, the amount of increase in the fuel calculated in S132 is set without being corrected (S138). Thus, the fuel injection amount is calculated based on the amount of increase in the fuel, and the catalyst warming fuel amount increase control is executed.

On the other hand, if it is determined in S134 that the adsorption selector valve 56 is open, that is, adsorption of the HC has ended, the amount of increase in the fuel calculated in S132 is increased (S136), and the corrected amount of increase in the fuel is set (S138). Thus, the fuel injection amount is calculated based on the corrected amount of increase in the fuel, and the catalyst warming fuel amount increase control is executed.

In S136, the amount of increase in the fuel, which should be achieved through the catalyst warming fuel amount increase control, is corrected to a value that is larger than the amount of increase in the fuel, which should be achieved through the catalyst warming fuel amount increase control when adsorption of the HC is taking place. The correction amount used in this case is set to a value that corresponds to the amount of increase in the secondary air, which is achieved when adsorption of the HC ends.

In the routine in FIG. 7, after adsorption of the HC ends, the amount of increase in the fuel injection amount is increased with an increase in the amount of secondary air that flows into the exhaust ports. Thus, a larger amount of HC is burned through afterburning. Therefore, it is possible to warm up the first catalyst 51 more quickly.

In the first embodiment of the invention, the structure that includes the adsorption selector valve 56 is employed. However, a structure that does not include the adsorption selector valve 56 may be employed. The HC adsorption member 52 and the second catalyst 57 may be formed integrally with each other. That is, instead of the structure that includes the HC adsorption member 52 and the second catalyst 57, a structure that includes an adsorptive removal catalyst, which has a lower layer formed of an adsorption member and an upper layer formed of a three-way catalyst, may be employed.

The first catalyst 51, the HC adsorption member 52, and the coolant temperature in the first embodiment of the invention may be used as a "first catalyst", an "adsorption member", and a "representative temperature" in the invention, respectively. When the ECU 20 executes the routine in FIG. 4, the ECU 20 may function as a "supply prohibition unit" in the invention. When the ECU 20 executes the routine in FIG. 4, the ECU 20 may function as a "supply start time control unit" in the invention. When the ECU 20 calculates the HC discharge amount according to the map shown in FIG. 5, the ECU 20 may function as a "hydrocarbon amount estimation unit" in the invention.

A second embodiment of the invention will be described with reference to FIGS. 8 and 9. Mainly the features that are different from those in the first embodiment of the invention will be described, and the description concerning the features that are the same as those in the first embodiment of the invention will be simplified or omitted. In a system according to the second embodiment of the invention, the hardware structure shown in FIG. 1 is employed and the ECU 20 executes the routines in FIGS. 8 and 9.

As described in the first embodiment of the invention, with the system shown in FIG. 1, it is possible to reliably minimize the amount of HC that is released into the atmosphere after the internal combustion engine 10 is started by combining adsorption of the HC on the HC adsorption member 52 with promotion of warm-up of the catalyst due to supply of the secondary air. In the second embodiment of the invention, if one of the function of adsorbing the HC and the function of supplying the secondary air is not performed due to a malfunction, the maximum use of the other function is made. In this way, deterioration of emission is minimized.

More specifically, if the secondary air supply device 60 malfunctions, the HC adsorption period is extended. If the secondary air cannot be supplied due to a malfunction of the secondary air supply device 60, the time when warm-up of the first catalyst 51 ends is delayed. Therefore, if HC adsorption ends at a regular time, there is a high possibility that warm-up of the first catalyst 51 has not been completed when adsorption of the HC ends and the HC may be released into the atmosphere. According to the second embodiment of the invention, in such a case, the HC adsorption period is extended to make the maximum use of the performance of the HC adsorption member 52 so that a larger amount of HC is adsorbed on the HC adsorption member 52.

In the second embodiment of the invention, if it is determined that the HC cannot be adsorbed on the HC adsorption member 52 due to a malfunction of the adsorption selector valve 56, supply of the secondary air is immediately started without controlling the time when supply of the secondary air is started. In addition, the amount of increase in the fuel, which should be achieved through the catalyst warming fuel amount increase control, is made larger than usual. By executing these controls, the first catalyst 51 is warmed as quickly as possible to achieve the state, where the first catalyst 51 is able to remove the HC, as quickly as possible.

Figure 8:
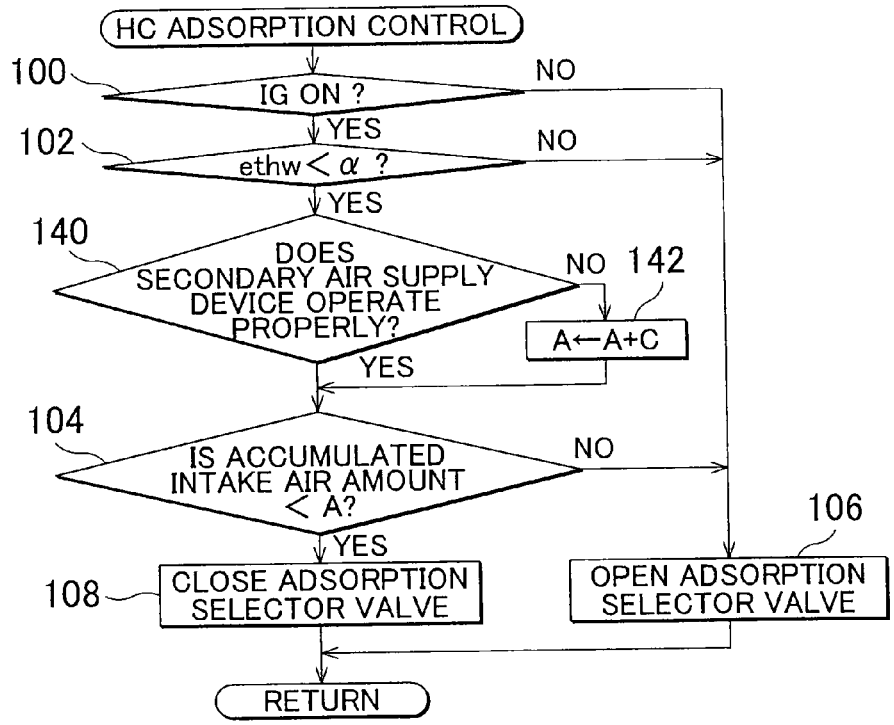
FIG. 8 is a flowchart showing a routine that is executed in a second embodiment of the invention.
Figure 9:
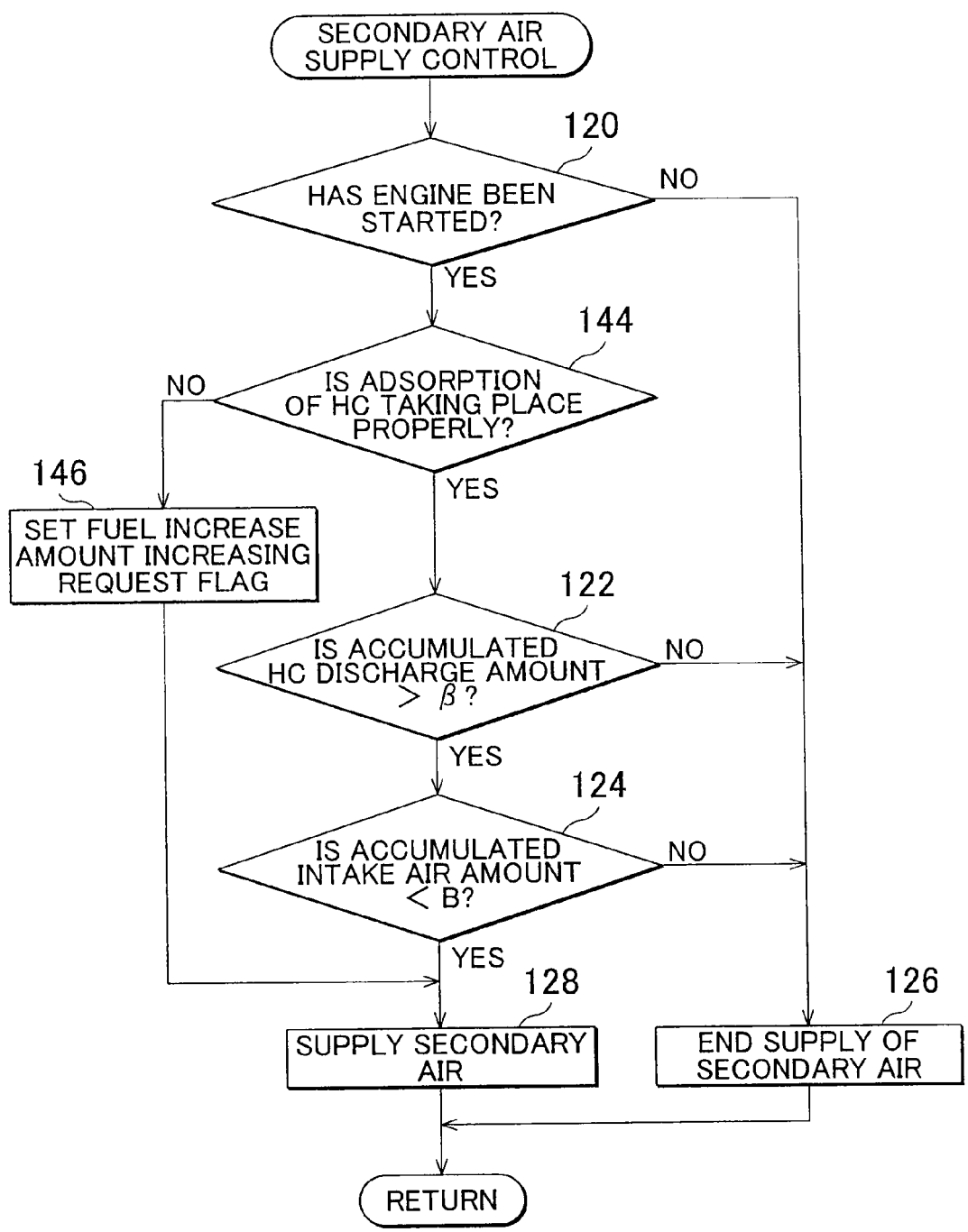
FIG. 9 is a flowchart showing a routine that is executed in the second embodiment of the invention.

FIGS. 8 and 9 show flowcharts of routines executed by the ECU 20 in the second embodiment of the invention in order to execute the above-described controls. These routines are periodically executed at predetermined time intervals. In the description concerning the steps in FIGS. 8 and 9, the same steps as those in FIGS. 3 and 4 will be denoted by the same step numbers and the description thereof will be omitted or simplified.

FIG. 8 is shows a routine of a HC adsorption control in the second embodiment of the invention. This routine is the same as the routine in FIG. 3 except that S140 and S142 are provided between S102 and S104. If it is determined in S100 in the routine in FIG. 8 that the ignition switch of the vehicle is on and it is determined in S102 that the coolant temperature ethw is lower than the reference value α, it is determined whether the secondary air supply device 60 operates properly (S140). The ECU 20 determines whether the secondary air supply device 60 operates properly based on, for example, a drive current for the air pump 68.

If it is determined in S140 that the secondary air supply device 60 operates properly, S104 and the following steps are executed as in the first embodiment of the invention. That is, the HC is continuously adsorbed on the HC adsorption member 52 until the accumulated intake air amount reaches the reference value A (S108). When the accumulated intake air amount reaches the reference value A, the adsorption selector valve 56 is opened to end adsorption of the HC on the HC adsorption member 52 (S106).

On the other hand, if it is determined in S140 that the secondary air supply device 60 malfunctions, the reference value A is increased by the predetermined value C (S142). Then, S104 and the following steps are executed with the use of the corrected reference value A. In this case, the time when adsorption of the HC ends is delayed because the reference value A is corrected to a larger value. That is, the HC adsorption period is extended.

According to the routine shown in FIG. 8, if warm-up of the first catalyst 51 is delayed due to a malfunction of the secondary air supply device 60, the HC adsorption period is extended. Thus, it is possible to make the maximum use of the performance of the HC adsorption member 52 so that a larger amount of HC is adsorbed on the HC adsorption member 52. Therefore, even if the secondary air supply device 60 malfunctions, deterioration of emission is minimized.

FIG. 9 shows a routine of a secondary air supply control in the second embodiment of the invention. The routine is the same as the routine shown in FIG. 4 except that S144 and S146 are provided between S120 and S122. If it is determined in S120 that the internal combustion engine 10 has been started, it is determined whether adsorption of HC is taking place properly (S144). S144 may be executed in the following manner. A stroke sensor (not shown) that detects the operation of the adsorption selector valve 56 is provided. If the stroke sensor detects the state where the adsorption selector valve 56 is closed, it is determined that adsorption of the HC is taking place properly. On the other hand, if the stroke sensor detects the state where the adsorption selector valve 56 is open, it is determined that the adsorption selector valve 56 malfunctions and adsorption of the HC cannot take place.

If it is determined in S144 that adsorption of the HC is taking place properly, S122 and the following steps are executed as in the first embodiment of the invention. That is, until the accumulated HC discharge amount, that is the accumulated amount of HC, which is discharged from the internal combustion engine 10, exceeds the reference value β, supply of the secondary air is prohibited (S126). After the accumulated HC discharge amount exceeds the reference value β, supply of the secondary air is started (S128).

On the other hand, if it is determined in S144 that adsorption of the HC cannot take place due to a malfunction, a flag used to increase the amount of increase in the fuel, which should be achieved through the catalyst warming fuel amount increase control, is set (S146). Then, supply of the secondary air is immediately started even if the accumulated HC discharge amount has not exceeded the reference value β (S1128).

In either case, the secondary air is continuously supplied until the accumulated intake air amount reaches the reference value B, as in the first embodiment of the invention.

According to the routine shown in FIG. 9, if it is determined that adsorption of the HC cannot take place due to a malfunction when the internal combustion engine 10 is started, supply of the secondary air is immediately started to promote warm-up of the first catalyst 51. Therefore, the first catalyst 51 is warmed as quickly as possible. As a result, deterioration of emission due to the fact that adsorption of the HC cannot take place is minimized. In addition, according to the second embodiment of the invention, if adsorption of the HC cannot take place, the amount of increase in the fuel, which should be achieved through the catalyst warming fuel amount increase control, is increased to increase the amount of HC that is burned through afterburning. Thus, it is possible to further increase the exhaust gas temperature and to warm up the first catalyst 51 more quickly.

The adsorption selector valve 56 in the second embodiment of the invention may function as a "selector valve" in the invention. When the ECU 20 executes S144, the ECU 20 may function as a "selector valve malfunction determination unit" in the invention. When the ECU 20 executes the routine shown in FIG. 9, the ECU 20 may function as a "supply start unit" in the invention. When the ECU 20 executes S104, the ECU 20 may function as an "adsorption end time control unit" in the invention. When the ECU 20 executes S140, the ECU 20 may function as a "secondary air supply device malfunction determination unit" in the invention. When the ECU 20 executes the routine shown in FIG. 8, the ECU 20 may function as an "adsorption end time delay unit" in the invention.

Next, a third embodiment of the invention will be described with reference to FIGS. 10 and 11. Mainly the features that are different from those in the above-described embodiments of the invention will be described, and the features that are the same as those in the above-described embodiments of the invention will be simplified or omitted.

The hardware structure in the third embodiment of the invention is substantially the same as that in the first embodiment of the invention. However, the internal combustion engine 10 in the third embodiment of the invention may operate with the use of the blended fuel formed by blending gasoline and alcohol (e.g. ethanol) at a given blending ratio. A system according to the third embodiment of the invention includes a fuel property sensor 72 that detects the alcohol concentration in the fuel that is supplied to the internal combustion engine 10. The fuel property sensor 72 detects the alcohol concentration in the blended fuel formed of gasoline and alcohol by detecting, for example, the capacitance, the refractive index, and the absorbance of the fuel. The fuel property sensor 72 is provided in a fuel tank or a fuel supply passage.

Because the HC adsorption control in the third embodiment of the invention is the same as that in the first embodiment of the invention, description concerning the HC adsorption control will not be provided below. A secondary air supply control according to the third embodiment of the invention will be described below.

Figure 10:
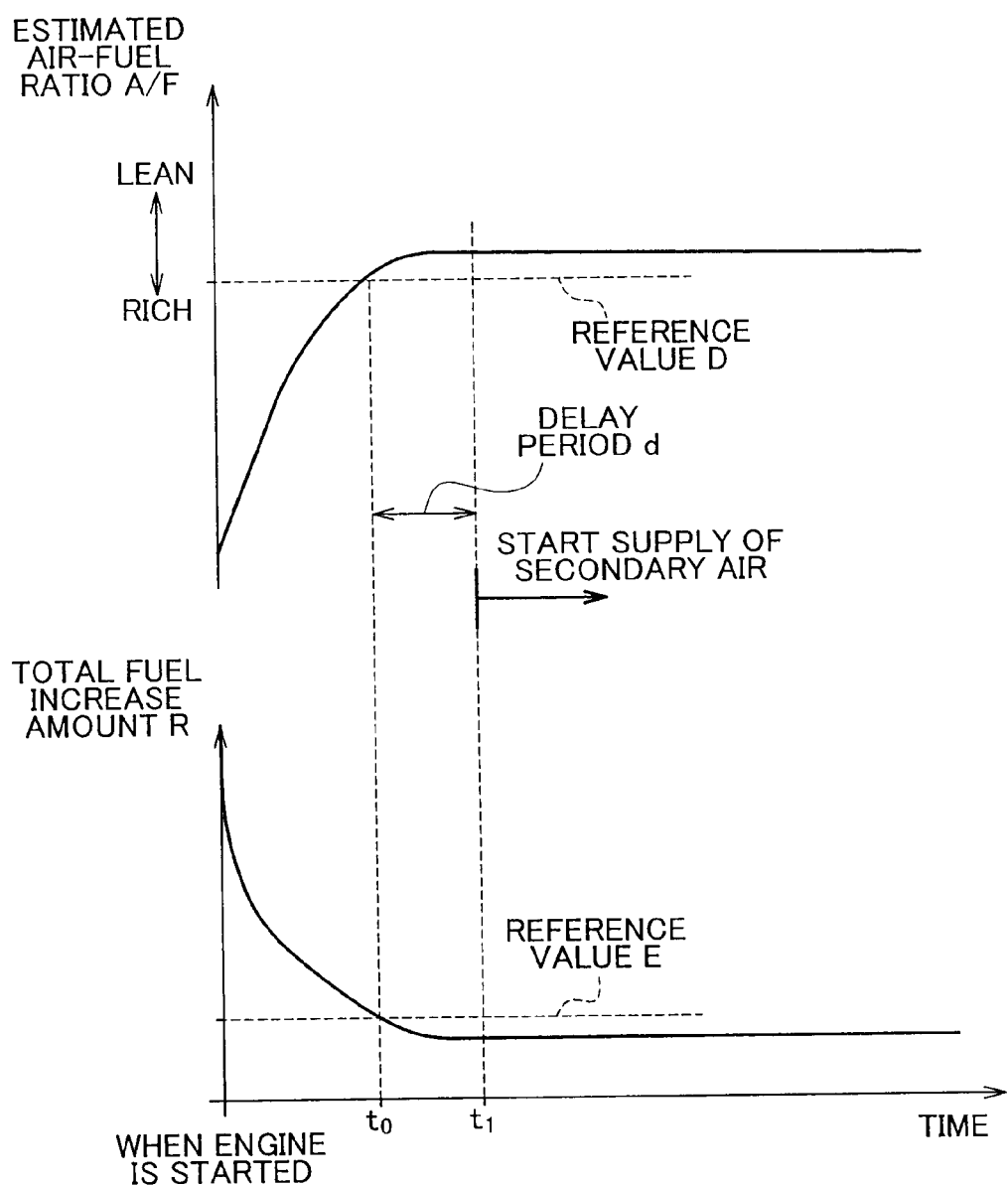
FIG. 10 is a graph for describing a manner of controlling the time when supply of the secondary air is started in a third embodiment of the invention.

FIG. 10 is a graph for describing a method of controlling the time when supply of the secondary air is started according to the third embodiment of the invention. In FIG. 10, the upper graph shows a temporal change in the estimated air-fuel ratio A/F after the internal combustion engine 10 is started, and the lower graph shows a temporal change in the total amount of increases in the fuel R (hereinafter, referred to as "total fuel increase amount R"). The estimated air-fuel ratio A/F is a value that is obtained by dividing the intake air amount detected by the airflow meter 44 by the fuel injection amount. That is, the estimated air-fuel ratio A/F is obtained by calculating the combustion air-fuel ratio in the internal combustion engine 10. The total fuel increase amount R is a total sum of the amounts of increases in the fuel, which should be achieved through various controls.

As described above, when the internal combustion engine 10 is started, the amount of fuel is increased to make up for the deficiency in evaporation of the fuel. The total fuel increase amount R, which is the total sum of the amounts of increases in the fuel, exhibits the largest value when the internal combustion engine 10 is started, and gradually decreases. If the total fuel increase amount R decreases, the fuel injection amount decreases. Therefore, as shown in FIG. 10, the estimated air-fuel ratio A/F is significantly lower than the stoichiometric air-fuel ratio (significantly richer than the stoichiometric air-fuel ratio) when the internal combustion engine 10 is started, and then the estimated air-fuel ratio A/F increases and approaches the stoichiometric air-fuel ratio.

The concentration of HC in the exhaust gas discharged from the internal combustion engine 10 is correlated with the combustion air-fuel ratio. Therefore, the concentration of HC in the exhaust gas discharged from the internal combustion engine 10 is correlated with the estimated air-fuel ratio A/F accurately. The concentration of HC in the exhaust gas discharged from the internal combustion engine 10 is determined to be higher at a lower (richer) estimated air-fuel ratio A/F. On the other hand, if the estimated air-fuel ratio A/F exceeds a predetermined value (e.g. value from approximately 13 to approximately 14 when the fuel is gasoline), it is determined that the concentration of HC in the exhaust gas discharged from the internal combustion engine 10 is relatively low. The reference value D in FIG. 10 is a value that is set to determine whether the concentration of HC in the exhaust gas discharged from the internal combustion engine 10 is relatively low. That is, if the estimated air-fuel ratio A/F exceeds the reference value D after the internal combustion engine 10 is started, it is determined that the concentration of HC in the exhaust gas discharged from the internal combustion engine 10 passes its peak, which is reached shortly after the internal combustion engine 10 is started, and is decreased to and maintained at a relatively low value. Therefore, in the third embodiment of the invention, supply of the secondary air is started at a time (time $t_1$ in FIG. 10) that is later than the time when the estimated air-fuel ratio A/F reaches the reference value D (time $t_0$ in FIG. 10) by the predetermined delay period d.

The delay period d is a value that is set in advance based on the stroke delay period that is required for the working gas in the internal combustion engine 10 to be discharged from the internal combustion engine 10 after the working gas undergoes the intake stroke, the compression stroke, the expansion stroke, and the exhaust stroke, and the transfer delay period from when the exhaust gas is discharged from the internal combustion engine 10 until when the exhaust gas finishes passing through the HC adsorption member 52. When the delay period d has elapsed after the estimated air-fuel ratio A/F reaches the reference value D, it is determined that the exhaust gas, which is discharged from the internal combustion engine 10 at or around the time when the peak amount of HC is discharged from the internal combustion engine 10, has finished passing through the HC adsorption member 52. Accordingly, the same effects as those in the first embodiment of the invention are obtained if supply of the secondary air is started at the time when the delay period d has elapsed after the estimated air-fuel ratio A/F reaches the reference value D.

In the third embodiment of the invention, the reference value D is corrected based on the alcohol concentration detected by the fuel property sensor 72. The stoichiometric air-fuel ratio differs between gasoline and alcohol. Therefore, the stoichiometric air-fuel ratio of the blended fuel formed of gasoline and alcohol varies depending on the alcohol concentration. Accordingly, the appropriate value of the reference value D varies depending on the alcohol concentration in the fuel. According to the third embodiment of the invention, the reference value D is corrected based on the alcohol concentration detected by the fuel property sensor 72. As a result, it is possible to start supply of the secondary air at the optimum time independently of the alcohol concentration in the fuel that is supplied to the internal combustion engine 10.

Figure 11:
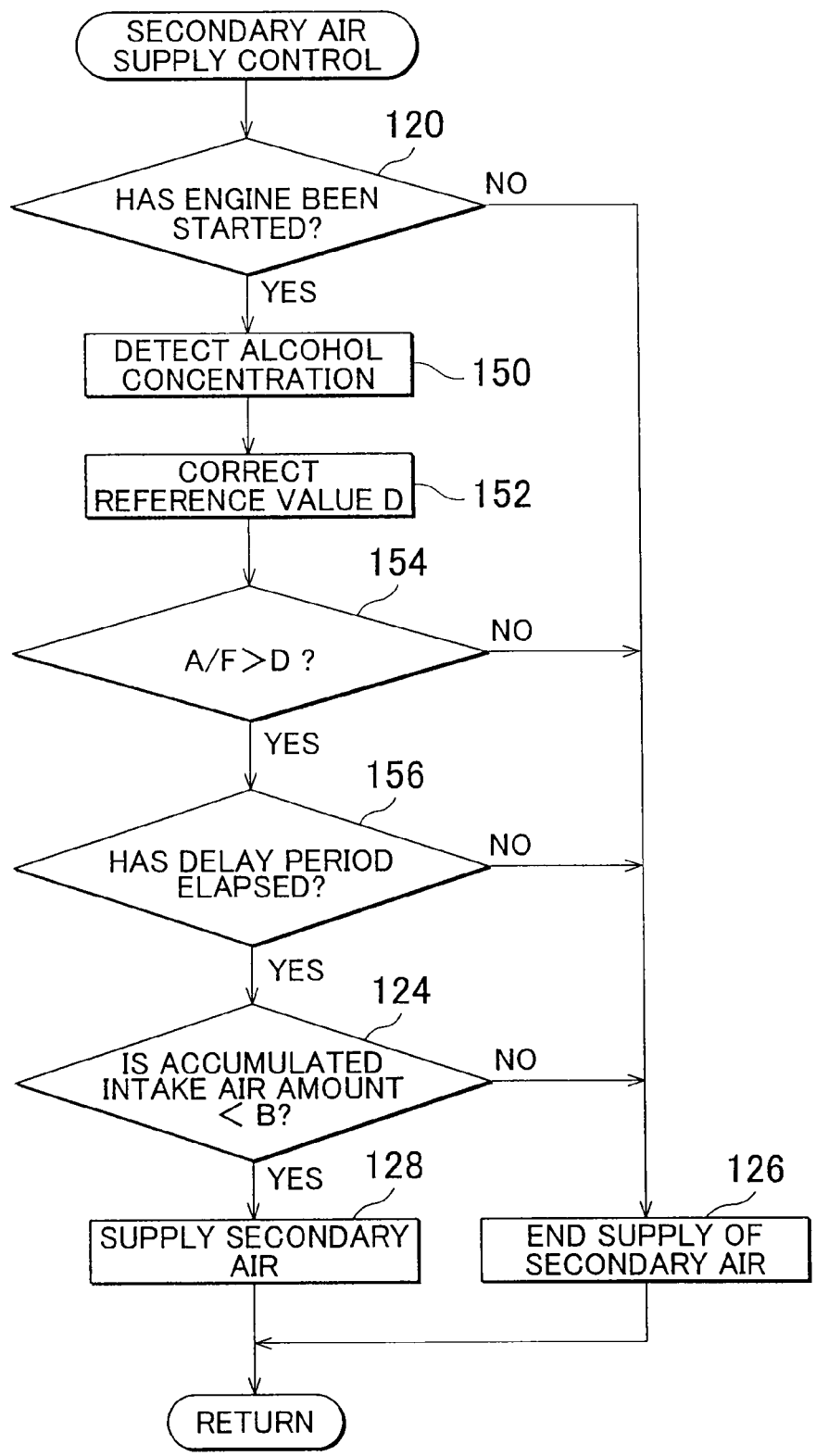
FIG. 11 is a flowchart of a routine that is executed in the third embodiment of the invention.

FIG. 11 is a routine of a secondary air supply control according to the third embodiment of the invention. The third embodiment is implemented when the ECU 20 executes the routine shown in FIG. 11 instead of the routine shown in FIG. 4. The routine in FIG. 11 differs from the routine shown in FIG. 4 in that S122 is deleted and S150 to S156 are added.

If it is determined in S120 in the routine in FIG. 11 that the internal combustion engine 10 has been started, the alcohol concentration in the fuel that is supplied to the internal combustion engine 10 is detected by the fuel property sensor 72 (S150). Then, a process for correcting the reference value D used to determine whether supply of the secondary air should start is executed based on the detected alcohol concentration (S152). The stoichiometric air-fuel ratio of alcohol (approximately 9 in the case of ethanol) is lower than the stoichiometric air-fuel ratio of gasoline (14.7). Therefore, in S152, the reference value D is corrected based on a predetermined map in such a manner that the reference value D decreases as the alcohol concentration in the fuel increases.

After S152 is completed, it is determined whether the estimated air-fuel ratio A/F has exceeded the corrected reference value D (S154). If it is determined that the estimated air-fuel ratio A/F has not exceeded the reference value D, it is determined that the optimum time when supply of the secondary air is started has not been reached. In this case, supply of the secondary air is not started (S126).

On the other hand, if it is determined in S154 that the estimated air-fuel ratio A/F has exceeded the reference value D, it is determined whether the above-described predetermined delay period d has elapsed after the estimated air-fuel ratio A/F exceeds the reference value D (S156). If it is determined that the delay period d has not elapsed after the estimated air-fuel ratio A/F exceeds the reference value D, it is determined that the optimum time when supply of the secondary air is started has not been reached. In this case, supply of the secondary air is not started (S126).

On the other hand, if it is determined in S156 that the delay period d has elapsed after the estimated air-fuel ratio A/F exceeds the reference value D, it is determined that the optimum time when supply of the secondary air is started has been reached. In this case, if an affirmative determination is made in S124, supply of the secondary air is started (S128). Supply of the secondary air ends when the accumulated intake air amount reaches the reference value B.

As described in the third embodiment of the invention, the time when supply of the secondary air is started may be controlled based on a value correlated with the amount of HC that is discharged from the internal combustion engine 10 (estimated air-fuel ratio A/F, in the third embodiment of the invention) instead of the amount of HC that is discharged from the internal combustion engine 10. In this case as well, the same effects as those in the first embodiment of the invention are obtained.

According to the third embodiment of the invention, the fuel property (alcohol concentration, in the third embodiment of the invention) is detected, and the reference value D is corrected based on the detected fuel property. In this way, the time when supply of the secondary air is started is corrected. Therefore, even if the property of the fuel that is supplied to the internal combustion engine 10 changes, the time when supply of the secondary air is started is adjusted to the optimum one based on the change in the fuel property.

In the third embodiment of the invention, the fuel property is directly detected by the fuel property sensor 72. Alternatively, the fuel property may be detected based on a learned value derived through an air-fuel ratio feedback control. As the fuel property, the mass density of the fuel may be used instead of the alcohol concentration.

In the third embodiment of the invention, the time when supply of the secondary air is started is controlled based on the estimated air-fuel ratio A/F. Alternatively, the time when supply of the secondary air is started may be controlled based on the fuel injection amount (total fuel increase amount R). That is, as shown in FIG. 10, when the total fuel increase amount R falls below the reference value E after the internal combustion engine 10 is started, it is determined that the concentration of HC in the exhaust gas that is discharged from the internal combustion engine 10 passes its peak, which is reached shortly after the internal combustion engine 10 is started, and is decreased to and maintained at a relatively low value. Accordingly, if the time when supply of the secondary air is started is controlled in such a manner that supply of the secondary air is started when the delay period d has elapsed after the total fuel increase amount R falls below the reference value E, the same effects as those described above are obtained.

The estimated air-fuel ratio A/F or the total fuel increase amount R (fuel injection amount) and the fuel property sensor 72 in the third embodiment of the invention may be used as a "value correlated with the amount of hydrocarbon discharged from the internal combustion engine" and a "fuel property detection unit" in the invention, respectively. When the ECU 20 executes S152 and S154, the ECU 20 may function as a "correction unit" in the invention.

What is claimed is:

1. An exhaust gas control apparatus for an internal combustion engine, comprising:
   a first catalyst that is provided in an exhaust system of the internal combustion engine;
   an adsorption member that is provided in the exhaust system at a position downstream of the first catalyst, and that has a function of adsorbing hydrocarbon in exhaust gas;
   a secondary air supply device that supplies secondary air to the exhaust system at a portion upstream of the first catalyst; and
   an electronic control unit (ECU) programmed to execute control of the exhaust system, the ECU configured to prohibit supply of the secondary air when the internal combustion engine is started, and configured to control a time when supply of the secondary air is started after the internal combustion engine is started based on an amount of hydrocarbon discharged from the internal combustion engine or a value correlated with the amount of hydrocarbon discharged from the internal combustion engine,
   wherein a hydrocarbon discharge characteristic during start-up of the internal combustion engine reaches a peak shortly after the internal combustion engine is started, and
   wherein the ECU is further configured to start supply of the secondary air at a time when the exhaust gas, which is discharged from the internal combustion engine at a time when the hydrocarbon having the peak hydrocarbon discharge characteristic is discharged from the internal combustion engine, finishes passing through the adsorption member.

2. The exhaust gas control apparatus according to claim 1, wherein the hydrocarbon discharge characteristic is a concentration of hydrocarbon in the exhaust gas discharged from the internal combustion engine.

3. The exhaust gas control apparatus according to claim 1, wherein the hydrocarbon discharge characteristic is an amount of hydrocarbon discharged from the internal combustion engine.

4. The exhaust gas control apparatus according to claim 1, wherein the value correlated with the amount of hydrocarbon discharged from the internal combustion engine is an amount of fuel injected into the internal combustion engine.

5. The exhaust gas control apparatus according to claim 1, wherein the value correlated with the amount of hydrocarbon discharged from the internal combustion engine is an estimated air-fuel ratio that is estimated based on an amount of fuel injected into the internal combustion engine and an amount of air taken into the internal combustion engine.

6. The exhaust gas control apparatus according to claim 1, wherein the amount of hydrocarbon is a value obtained by accumulating an amount of hydrocarbon discharged from the internal combustion engine after the internal combustion engine is started.

7. The exhaust gas control apparatus according to claim 1, wherein the amount of hydrocarbon is an amount of hydrocarbon discharged from the internal combustion engine per unit time.

8. The exhaust gas control apparatus according to claim 1, wherein the ECU is further configured to estimate the amount of hydrocarbon based on a representative temperature of the internal combustion engine.

9. The exhaust gas control apparatus according to claim 1, further comprising:
a selector valve that switches an exhaust gas introduction state between a state where the exhaust gas discharged from the internal combustion engine is introduced into the adsorption member and a state where the exhaust gas discharged from the internal combustion engine is not introduced into the adsorption member,
wherein the ECU is further configured to increase an amount of fuel to supply hydrocarbon that is burned by the secondary air when the secondary air is supplied, and configured to increase the amount of fuel by a larger amount when the state where the exhaust gas is not introduced into the adsorption member is selected by the selector valve than when the state where the exhaust gas is introduced into the adsorption member is selected by the selector valve.

10. The exhaust gas control apparatus according to claim 1, further comprising:
a selector valve that switches an exhaust gas introduction state between a state where the exhaust gas discharged from the internal combustion engine is introduced into the adsorption member and a state where the exhaust gas discharged from the internal combustion engine is not introduced into the adsorption member,
wherein the ECU is further configured to determine whether the selector valve malfunctions, and configured to immediately start supply of the secondary air if it is determined that the exhaust gas is not introduced into the adsorption member due to a malfunction of the selector valve.

11. The exhaust gas control apparatus according to claim 1, further comprising:
a selector valve that switches an exhaust gas introduction state between a state where the exhaust gas discharged from the internal combustion engine is introduced into the adsorption member and a state where the exhaust gas discharged from the internal combustion engine is not introduced into the adsorption member,
wherein the ECU is further configured to end adsorption of hydrocarbon by operating the selector valve to switch the exhaust gas introduction state to the state where the exhaust gas discharged from the internal combustion engine is not introduced into the adsorption member, when a predetermined hydrocarbon adsorption end condition is satisfied after the internal combustion engine is started.

12. The exhaust gas control apparatus according to claim 11, wherein the ECU is further configured to determine whether the secondary air supply device malfunctions, and configured to delay a hydrocarbon adsorption end time with respect to a regular hydrocarbon adsorption end time if it is determined that the secondary air supply device malfunctions.

13. The exhaust gas control apparatus according to claim 1, wherein the ECU is further configured to detect a property of the fuel that is supplied to the internal combustion engine, and configured to correct the time when supply of the secondary air is started based on a detection result obtained by the ECU.

14. The exhaust gas control apparatus according to claim 1, further comprising:
a second catalyst that is provided downstream of the adsorption member or that is formed integrally with the adsorption member.

15. The exhaust gas control apparatus according to claim 1, wherein the adsorption member includes a cylindrical structure accommodated in an exhaust flow in the exhaust system.

16. An exhaust gas control apparatus for an internal combustion engine, comprising:
a first catalyst that is provided in an exhaust system of the internal combustion engine;
an adsorption member that is provided in the exhaust system at a position downstream of the first catalyst, and that has a function of adsorbing hydrocarbon in exhaust gas;
a secondary air supply device that supplies secondary air to the exhaust system at a portion upstream of the first catalyst; and
an electronic control unit (ECU) programmed to execute control of the exhaust system, the ECU configured to
prohibit supply of the secondary air when the internal combustion engine is started,
control a time when supply of the secondary air is started after the internal combustion engine is started based on an amount of hydrocarbon discharged from the internal combustion engine or a value correlated with the amount of hydrocarbon discharged from the internal combustion engine, and
start supply of the secondary air at a time when the exhaust gas, which is discharged from the internal combustion engine during a period from when the internal combustion engine is started until when a combustion air-fuel ratio exceeds a predetermined value near a stoichiometric air-fuel ratio, finishes passing through the adsorption member.

* * * * *